US012766462B2

(12) United States Patent
Park et al.

(10) Patent No.: US 12,766,462 B2
(45) Date of Patent: Oct. 20, 2026

(54) DEHUMIDIFIER

(71) Applicant: LG ELECTRONICS INC., Seoul (KR)

(72) Inventors: Sangjin Park, Seoul (KR); Taeun Heo, Seoul (KR); Juhyup Yoon, Seoul (KR); Inmun Yu, Seoul (KR); Bowon Heo, Seoul (KR); Jin Woo Been, Seoul (KR); Hyunwoo Lee, Seoul (KR); Jongwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 18/772,431

(22) Filed: Jul. 15, 2024

(65) Prior Publication Data

US 2025/0269323 A1 Aug. 28, 2025

(30) Foreign Application Priority Data

Feb. 22, 2024 (KR) ........................ 10-2024-0026073

(51) Int. Cl.
*F25D 27/00* (2006.01)
*B01D 53/26* (2006.01)

(52) U.S. Cl.
CPC ........... *B01D 53/265* (2013.01); *F25D 27/00* (2013.01); *B01D 2257/80* (2013.01); *B01D 2258/06* (2013.01)

(58) Field of Classification Search
CPC ..... F24F 1/0083; G05D 22/00; B01D 53/265; B01D 2257/80; B01D 2258/06; F25D 27/00
See application file for complete search history.

(56) References Cited

U.S. PATENT DOCUMENTS

2006/0283327 A1* 12/2006 Yoon ..................... F24F 3/1423 62/272
2013/0112130 A1* 5/2013 Antonelli ................ B63B 43/14 114/123

(Continued)

FOREIGN PATENT DOCUMENTS

KR 10-2015-0124834 11/2015
KR 10-2016-0006419 1/2016

OTHER PUBLICATIONS

Machine translation of KR1020160006419. (Year: 2016).*

*Primary Examiner* — Marc E Norman
(74) *Attorney, Agent, or Firm* — KED & ASSOCIATES, LLP

(57) ABSTRACT

A dehumidifier according to an embodiment may include a housing including a suction grill formed on a rear surface thereof, and a discharge port formed on an upper surface thereof; a dehumidification module provided inside of the housing; a water tank detachably provided on one side of the housing and that stores condensate generated during a dehumidification process; a discharge cover that opens and closes the discharge port; a tilting module connected to a bottom of the discharge cover inside of the housing to tilt the discharge cover; and a shielding cover that accommodates the tilting module. The dehumidification module may include at least a compressor, a condenser, an evaporator, and a fan module. The tilting module may include a tilting motor fixed to the shielding cover; a tilting gear connected to a shaft of the tilting motor; and a tilting neck curved at a predetermined curvature and having on one surface thereof a tilting rack that engages with the tilting gear.

16 Claims, 10 Drawing Sheets

(56) References Cited

U.S. PATENT DOCUMENTS

| | | | | |
|---|---|---|---|---|
| 2025/0283612 | A1* | 9/2025 | Park | F24F 1/0083 |
| 2025/0290647 | A1* | 9/2025 | Park | F24F 3/1405 |
| 2025/0290657 | A1* | 9/2025 | Park | F24F 1/0358 |

* cited by examiner

DEHUMIDIFIER

CROSS-REFERENCE TO RELATED APPLICATION(S)

This application claims the benefits of priority to Korean Patent Application No. 10-2024-0026073, filed in Korea on Feb. 22, 2024, the contents of which is incorporated herein by reference in its entirety.

BACKGROUND

1. Field

A dehumidifier is disclosed herein.

2. Background

A dehumidifier is a device that lowers a humidity in a space in which the dehumidifier is installed by suctioning in air, removing moisture contained in the air, and discharging the dehumidified air back into the room. In general, dehumidifiers are widely used to lower the humidity of indoor air in humid summer or to quickly dry laundry.

Dehumidifiers are divided into a desiccant type and a condensation type depending on a dehumidification method. In the condensation type, a refrigerant cycle is installed inside of the dehumidifier, air suctioned in by a fan passes through an evaporator to condense moisture contained in the air, and then passes through the condenser and is discharged back into a room in a heated state.

Korean Patent Publication No. 2015-0124834, which is hereby incorporated by reference, discloses a dehumidifier having a disadvantage in that a discharge port is always exposed to the outside, which is not only unattractive in appearance, but also causes foreign substances, such as dust, to flow into a fan module through the discharge port when not in use. In addition, as a flow direction of air discharged into a room through the discharge port is fixed in a vertical direction, there is a disadvantage that the dehumidifier itself must be rotated to adjust the flow direction in lateral directions.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a dehumidifier according to an embodiment will be described with reference to the drawings.

Figure 1:
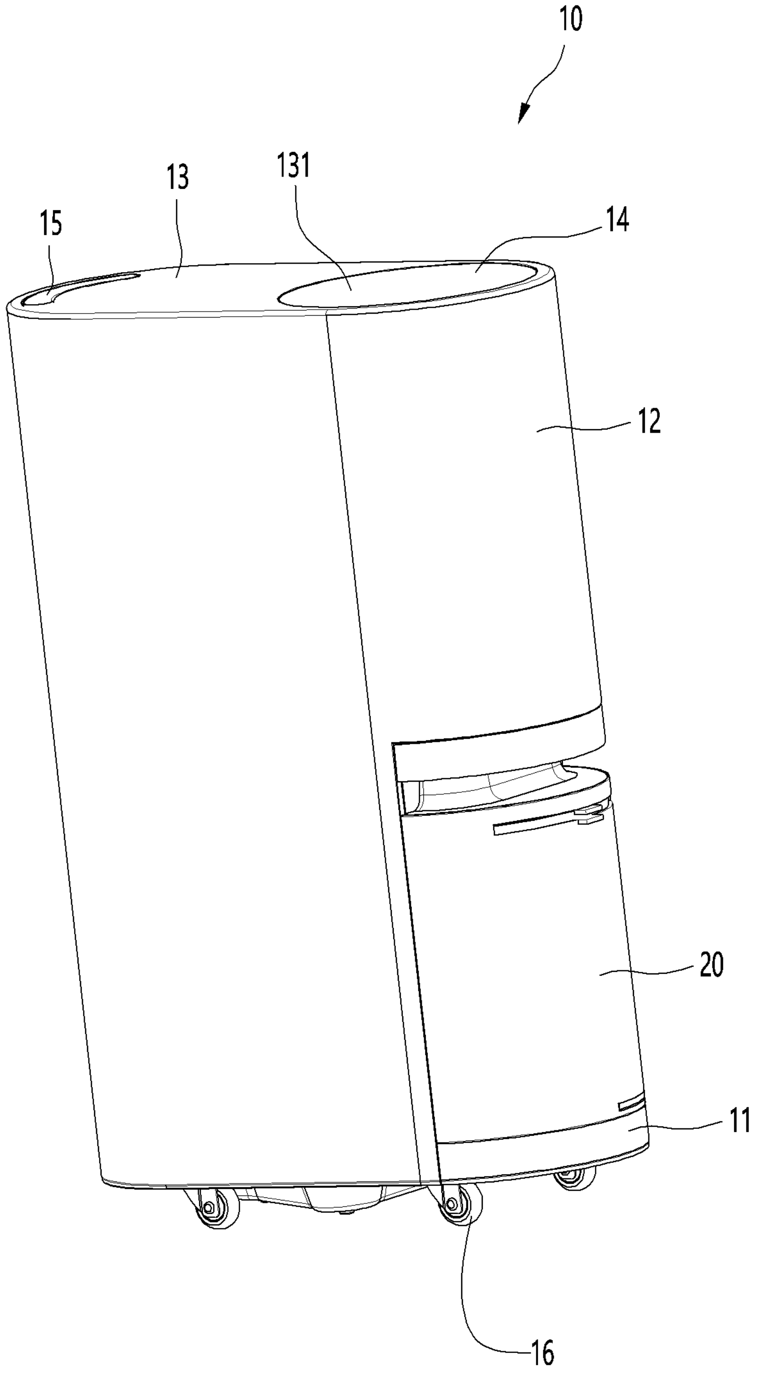
FIG. 1 is a perspective view of a dehumidifier according to an embodiment with a discharge port in a closed state.
Figure 2:
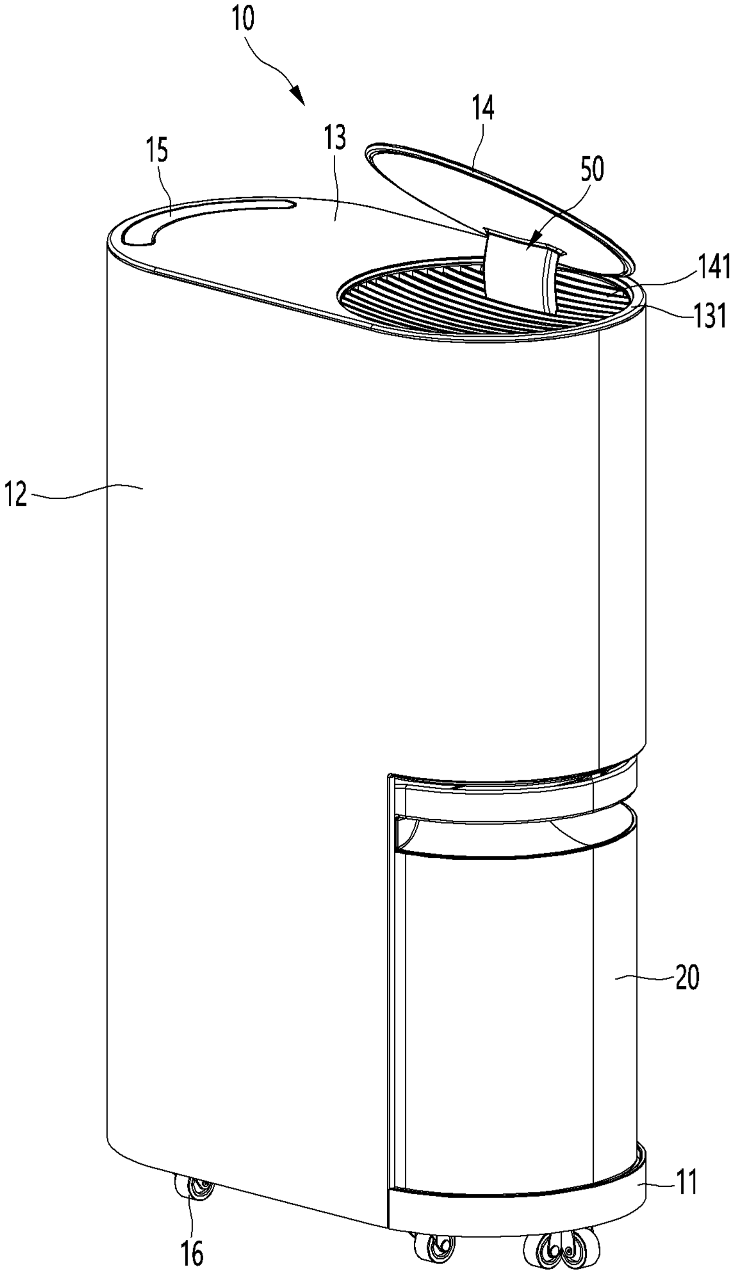
FIG. 2 is a perspective view of the dehumidifier of FIG. 1 with the discharge port in an open state.
Figure 3:
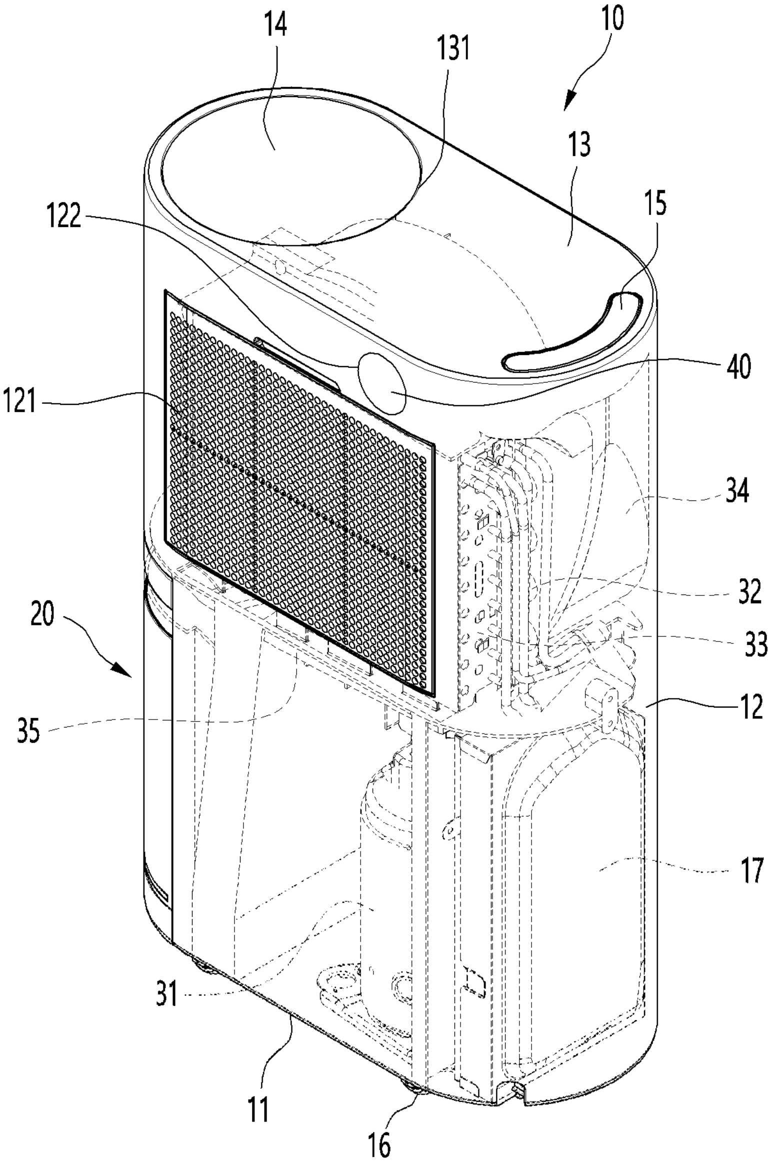
FIG. 3 is a rear perspective view of the dehumidifier of FIG. 1.
Figure 4:
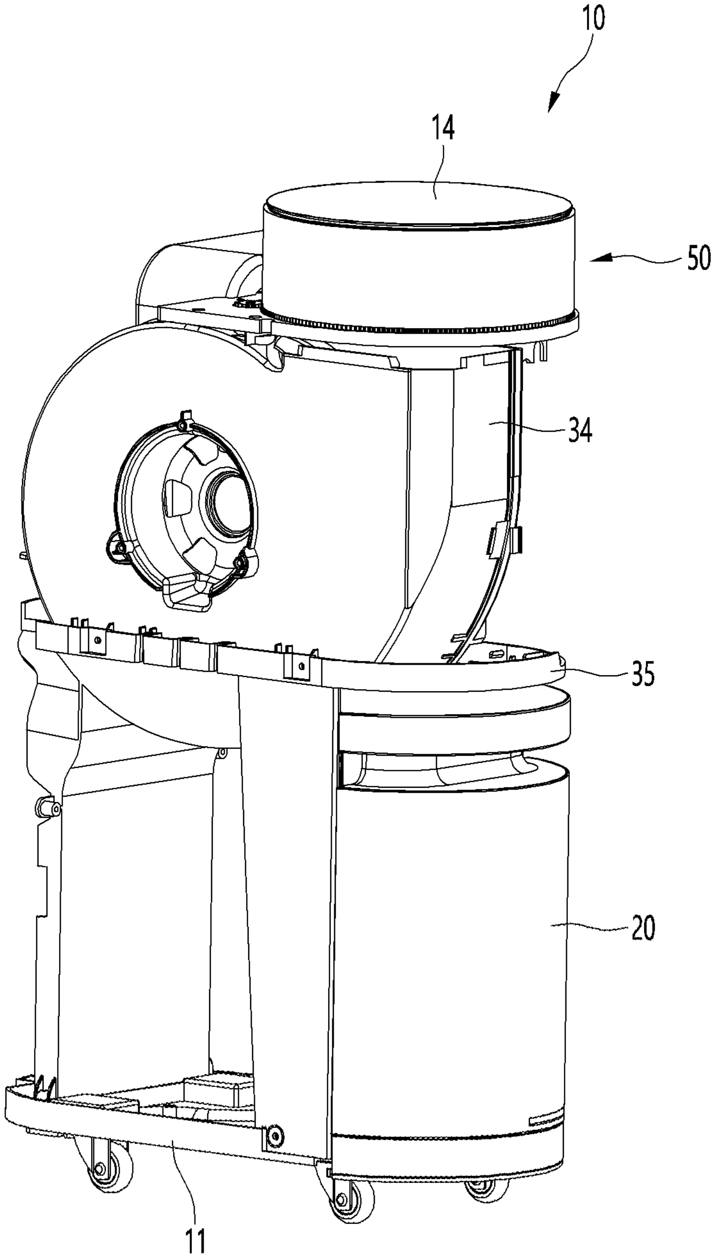
FIG. 4 is a perspective view of the dehumidifier of FIG. 1 with a housing removed.

FIG. 1 is a perspective view of a dehumidifier according to an embodiment with a discharge port in a closed state. FIG. 2 is a perspective view of the dehumidifier of FIG. 1 with the discharge port in an open state. FIG. 3 is a rear perspective view of the dehumidifier of FIG. 1. FIG. 4 is a perspective view of the dehumidifier of FIG. 1 with a housing removed.

Referring to FIGS. 1 to 4, dehumidifier 10 according to an embodiment may have a slim shape with a relatively thin thickness in a frontward-to-backward direction. The dehumidifier 10 may have a thickness extending in the frontward-to-backward direction, a width extending in a leftward-rightward or lateral direction, and a height extending in a vertical direction.

The dehumidifier 10 may include a housing that forms an exterior thereof. The dehumidifier 10 may further include a dehumidification module installed inside of the housing. The dehumidifier 10 may further include a water tank 20 that stores condensate generated during the dehumidification process.

The housing may include a base 11, a case 12, and a top cover 13. The base 11 may form a lower portion of the dehumidifier 10. A plurality of wheels 16 may be mounted on a bottom of the base 11 to facilitate movement of the dehumidifier 10. The case 12 may be disposed on an upper edge of the base 11, and an upper opening of the case 12 may be shielded by the top cover 13.

A suction grill 121 may be formed on a back of the case 12 to intake indoor air. A filter module may be mounted in front of the suction grill 121. The suction grill 121 may be defined as a suction port or inlet through which indoor air is suctioned.

A main discharge port 131, through which dehumidified air may be discharged may be formed on one or a first side of the top cover 13. The main discharge port 131 may be selectively opened or closed by the discharge cover 14.

A handle 15 may be provided on the other or a second side of the top cover 13. The handle 15 has an n-shape so that a vertical portion thereof may be inserted into the case 12 or pulled out from the case 12. When the vertical portion is fully inserted into the case 12, a horizontal portion of the handle 15, that is, an upper surface of a portion configured to be held by a hand, may be flush with the top cover 13.

The main discharge port 131 may be disposed at one or a first edge of the top cover 13. The handle 15 may be placed on the other or a second edge of the top cover 13. The main discharge port 131 and the handle 15 may be located on opposite edges. A discharge grill 141 may be mounted on the main discharge port 131.

A cutout into which the water tank 20 may be inserted may be formed at one edge of the case 12, and the water tank 20 may be detachable from the case 12. When the water tank 20 is mounted on the case 12, an outer surface of the water tank 20 may form a portion of the case 12. The water tank 20 may be located right beneath the main discharge port 131.

The dehumidification module may include a compressor 31 that compresses a refrigerant, a condenser 32 that condenses the refrigerant that has passed through the compressor 31, an expansion valve that expands the refrigerant that has passed through the condenser 32 into a two-phase refrigerant, and an evaporator 33 that evaporates the refrigerant that has passed through the expansion valve. The dehumidification module may further include a fan module 34 that suctions indoor air through the suction grill 121. The evaporator 33 may be located in front of the suction grill 121, the condenser 32 may be located in front of the evaporator 33, and the fan module 34 may be located in front of the condenser 32.

The condenser 32 and the evaporator 33 may be seated on an upper surface of a drain pan 35. Condensed water flowing down from a surface of the evaporator 33 may flow along the drain pan 35 and collected in the water tank 20.

An outlet of the fan module 34 may be connected to the main discharge port 131. The discharge grill 141 may be disposed right above the outlet of the fan module 34.

Indoor air may sequentially pass through the suction grill 121, a filter module, the evaporator 33, and the condenser 32 and then be suctioned into the fan module 34. Air suctioned into the fan module 34 may be discharged through the main discharge port 131.

The air introduced into the case 12 through the suction grill 121 may be dehumidified while passing through the evaporator 33, and moisture contained in the air condensed. As a result, the incoming air becomes low-temperature and dry as it passes through the evaporator 33.

The low-temperature dry air absorbs heat while passing through the condenser 32, and as a result, is changed to a high-temperature dry state and is then discharged back into the room through the main discharge port 131. The term "high temperature air" may refer to air with a temperature slightly higher than a temperature of an indoor space in which the dehumidifier 10 is installed.

A control box 17 may be accommodated inside of the case 12, to control operation of the dehumidification module and various drive means.

A sub discharge port 122 through which dehumidified air may be discharged may be further formed in the case 12. The sub discharge port 122 may be selectively opened or closed by a damper module 40.

When the sub discharge port 122 is open, the main discharge port 131 may be closed, and when the sub discharge port 122 is closed, the main discharge port 131 may be open. Accordingly, the dehumidified air may be selectively discharged only through either the main discharge port 131 or the sub discharge port 122.

The sub discharge port 122 may be formed on a front surface or a rear surface of the case 12. The sub discharge port 122 may be disposed at an upper side of the fan module 34. For example, the sub discharge port 122 may be formed on the rear surface of the case 12 and may be located above the suction grill 121.

The dehumidifier 10 may further include the damper module 40 that selectively opens or closes the sub discharge port 122. The damper module 40 may be installed inside of the sub discharge port 122 and may open or close the sub discharge port 122. The damper module 40 may operate in a direction to close the sub discharge port 122.

A cover drive unit 50 according to an embodiment may be mounted on or at the outlet of the fan module 34. The cover drive unit 50 may perform an operation of tilting the discharge cover 14 in upward and downward directions and an operation of rotating the discharge cover 14 in a tilted state clockwise or counterclockwise.

Figure 5:
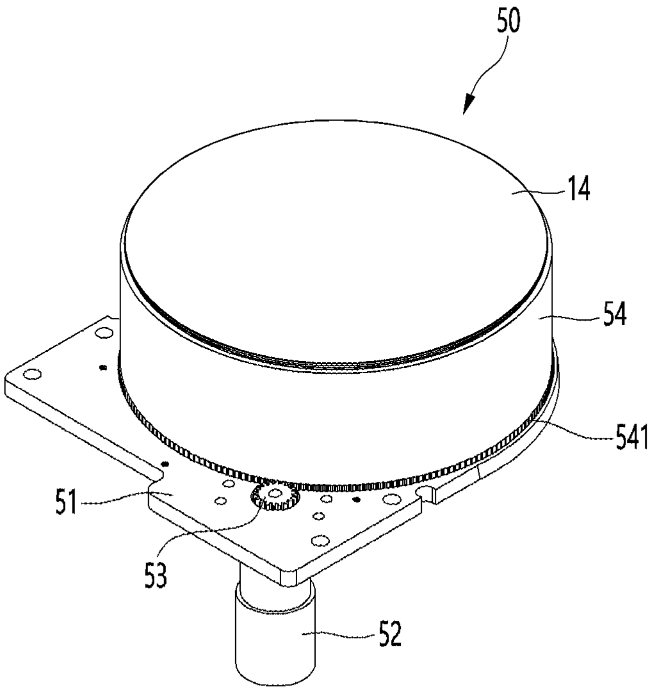
FIG. 5 is a front perspective view of a cover drive unit according to an embodiment.
Figure 6:
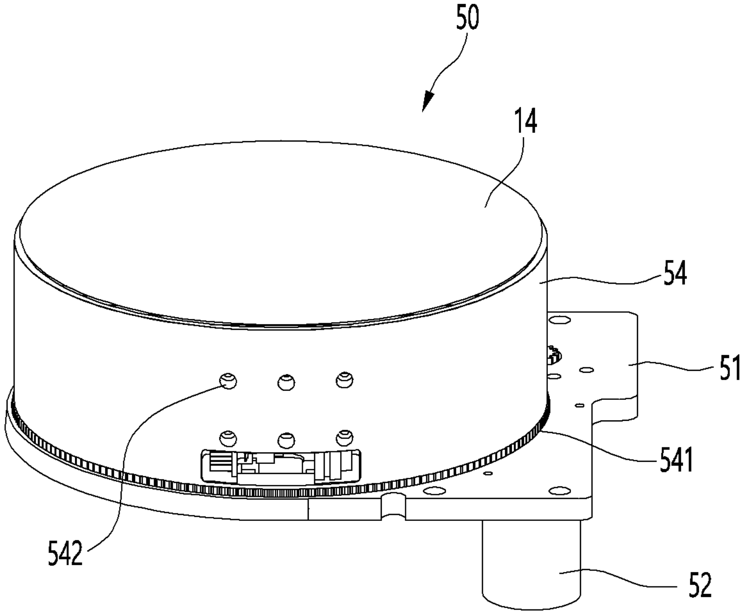
FIG. 6 is a rear perspective view of the cover drive unit of FIG. 5.

FIG. 5 is a front perspective view of a cover drive unit according to an embodiment. FIG. 6 is a rear perspective view of the cover drive unit of FIG. 5.

Referring to FIGS. 5 and 6, the cover drive unit 50 according to an embodiment may include a guide plate 51 mounted on or at the outlet of the fan module 34; a cylindrical cover sleeve 54 with a rotation rack 541 formed at a lower end of an outer peripheral surface thereof and mounted on the guide plate 51; a pinion 53 mounted on the guide plate 51 to be engaged with the rack gear 541; a rotation motor 52 that supplies a rotational force to the pinion 53; and a tilting module that tilts the discharge cover 14 in the upward and downward directions.

The discharge cover 14 may selectively block an opening formed at a top of the cover sleeve 54, and an inner diameter of the cover sleeve 54 may be formed to be the same in size as an inner diameter of the main discharge port 131. In addition, the discharge grill 141 may be coupled to an inside of an upper end of the cover sleeve 54, may rotate as one body with the cover sleeve 54, and may be opened or closed by the discharge cover 14. A plurality of fastening holes 542 may be formed on a rear surface of the cover sleeve 54.

Figure 7:
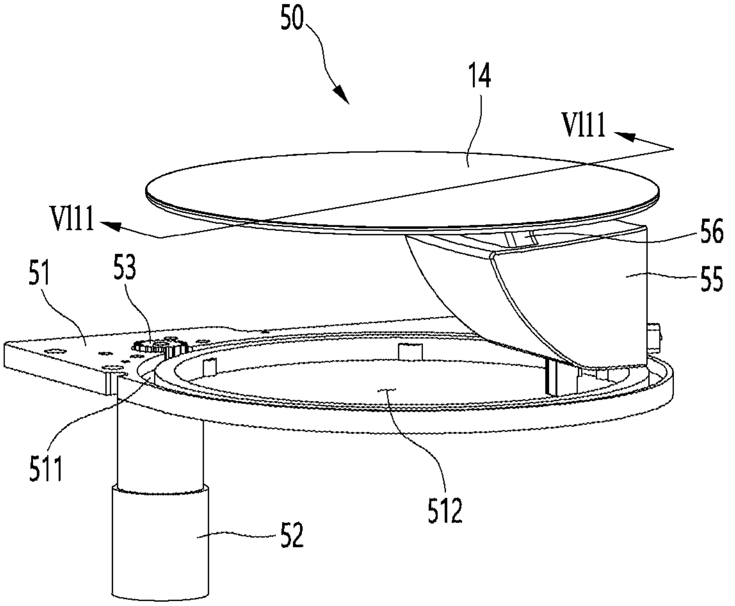
FIG. 7 is a perspective view showing the cover drive unit with a cover sleeve removed.
Figure 8:
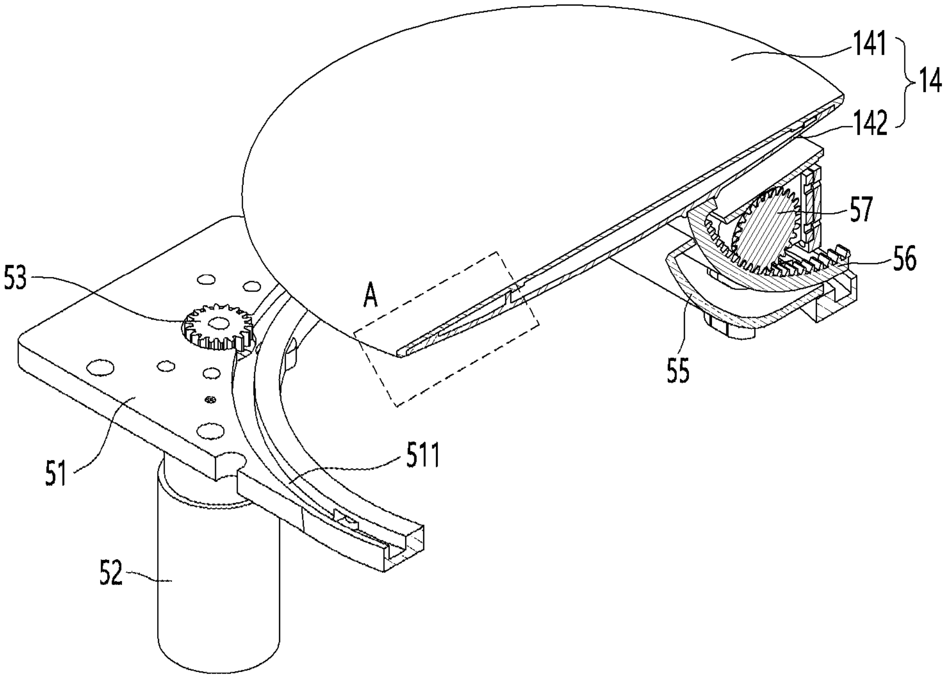
FIG. 8 is a longitudinal cross-sectional view of the cover drive unit, taken along line VIII-VIII of FIG. 7.
Figure 9:
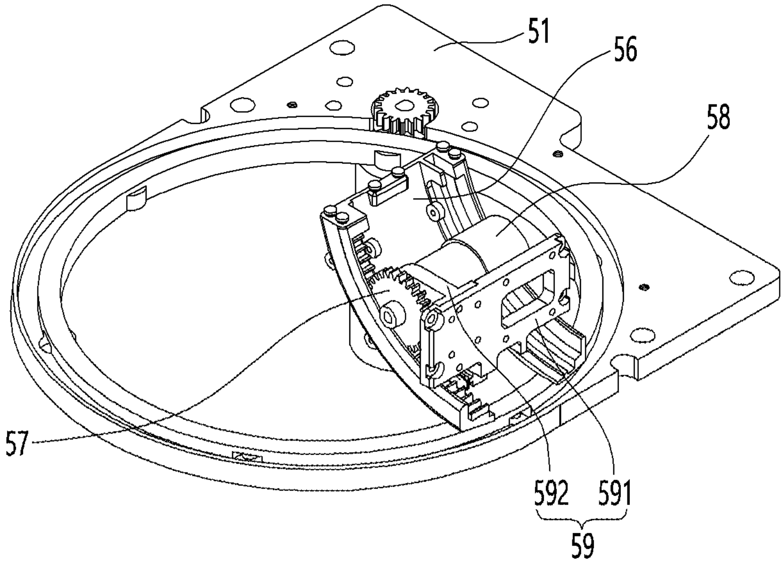
FIGS. 9 and 10 are perspective views of a tilting module according to an embodiment.
Figure 10:
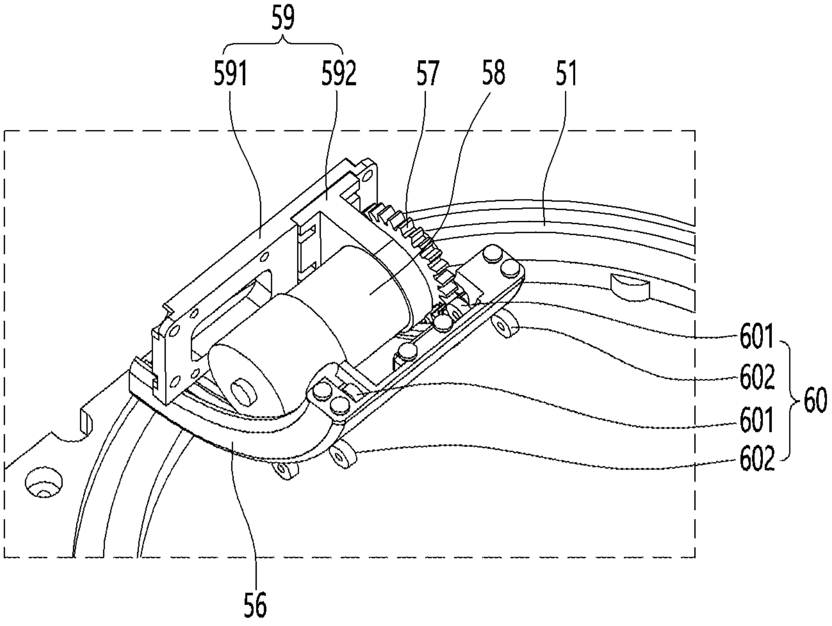

FIG. 7 is a perspective view showing the cover drive unit with a cover sleeve removed. FIG. 8 is a longitudinal cross-sectional view of the cover drive unit, taken along VIII-VIII in FIG. 7 FIGS. 9 and 10 are perspective views of a tilting module.

Referring to FIGS. 7 to 10, the cover drive unit 50 according to an embodiment may include the guide plate 51; a shielding cover 55 coupled to a rear surface of the cover sleeve 54; and a tilting module accommodated inside the shielding cover 55. An outlet 512 having a size corresponding to a diameter of the outlet of the fan module 34 may be formed in the guide plate 51, and a sleeve groove 511 in which the cover sleeve 54 may be seated may be formed on an upper surface of the guide plate 51 corresponding to an outside of the outlet 512.

The pinion 53 may be located on an edge of the sleeve groove 511 and engaged with the rotation rack 541 formed on the outer peripheral surface of the cover sleeve 54. As the rotation motor 52 operates, the pinion 53 engages with the rotation rack 541 and rotates, causing the cover sleeve 54 to rotate clockwise or counterclockwise. The cover sleeve 54 and the discharge cover 14 may rotate as one body. The discharge cover 14 may include a circular upper plate 141 and a lower plate 142 coupled to a bottom of the upper plate 141. The lower plate 142 may be formed to be rounded to be convex downward from an edge to a center.

The tilting module may include an arc-shaped tilting neck 56 that is rounded at a predetermined curvature and has a tilting rack 561 formed on its upper surface, a tilting gear 57 engaged with the tilting rack 561, a tilting motor 58 that rotates the tilting gear 57, a bracket 59 that supports the tilting motor 58, and a guide roller 60 that guides movement of the tilting neck 56 in a circumferential direction.

The bracket 59 may include a fixing bracket 591 and a support bracket 592. The fixing bracket 591 is a bracket that connects a rear surface of the shield cover 55 and the rear surface of the cover sleeve 54, and one or more fastening members may sequentially pass through fastening holes 542 formed on a back of the cover sleeve 54 and the fixing bracket 591 to be inserted into a seating protrusion 553 on the rear surface of the shielding cover 55. Therefore, when the cover sleeve 54 rotates, the shielding cover 55 and the discharge cover 14 rotate together.

As shown in the drawings, the support bracket 592 may be orthogonally coupled to the fixing bracket 591, and a shaft of the tilting motor 58 may pass through the support bracket 592. The tilting gear 57 may be coupled to the shaft of the tilting motor 58 that has passed through the support bracket 592.

When the tilting motor 58 is driven, the tilting gear 57 rotates to raise or lower the tilting neck 56. The discharge cover 14 coupled to an upper end of the tilting neck 56 may be tilted at a predetermined angle according to a rotational amount of the tilting neck 56. The upper end of the tilting neck 56 may be coupled to the lower plate 142 of the discharge cover 14 at a point spaced apart from a center of the lower plate 142 towards the rear surface of the shielding cover 55.

Figure 11:
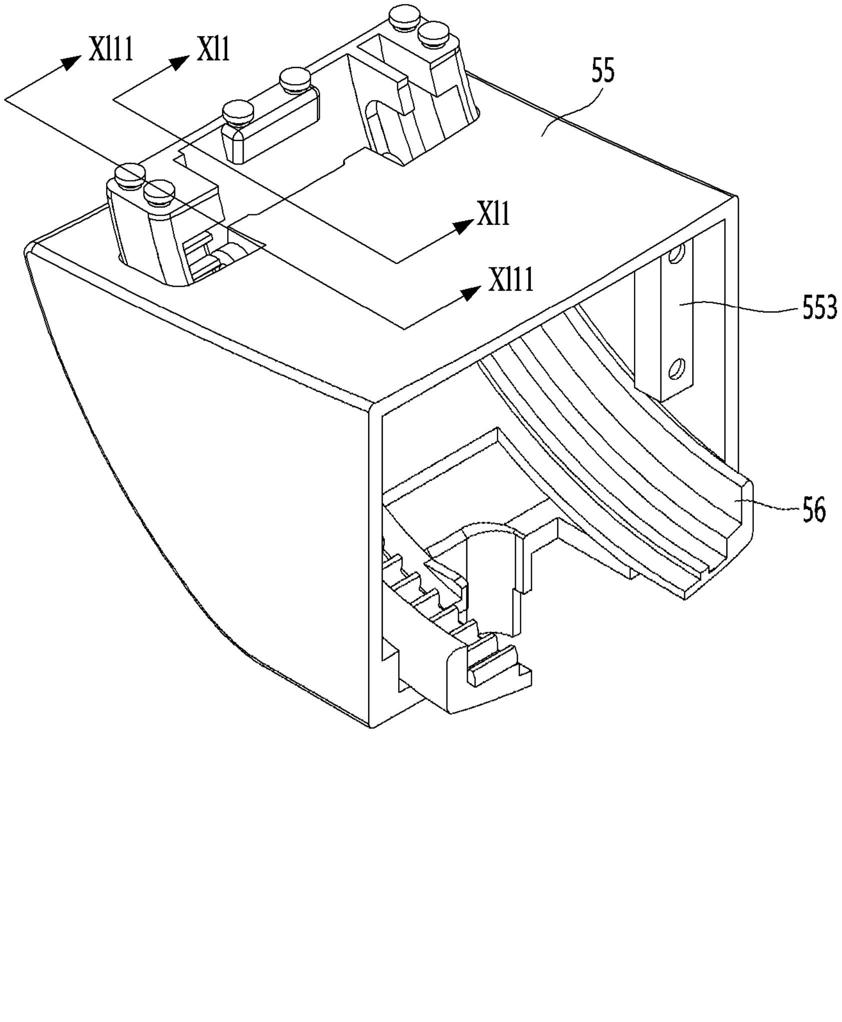
FIG. 11 is a perspective view showing a combination of a shielding cover and a tilting module according to an embodiment.
Figure 12:
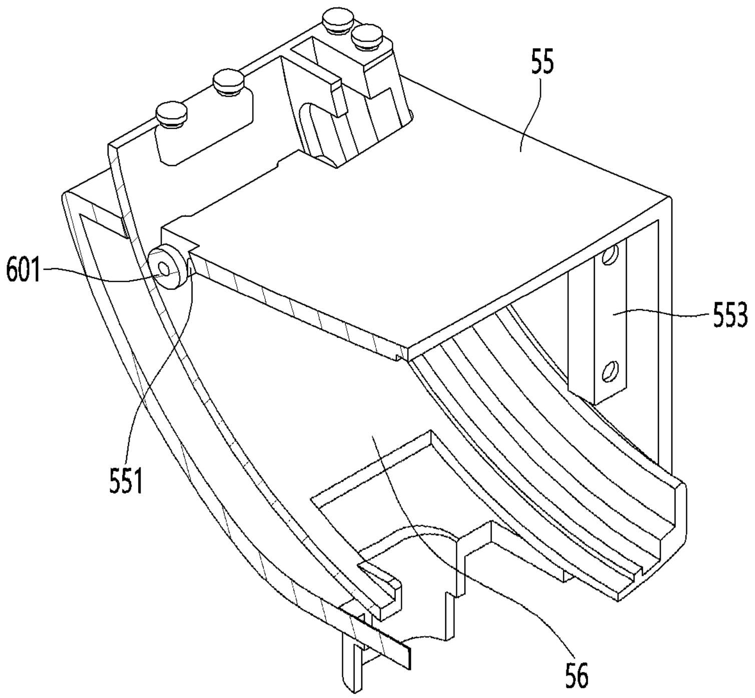
FIG. 12 is a longitudinal cross-sectional view, taken along line XII-XII of FIG. 11.

FIG. 11 is a perspective view showing a combination of a shielding cover and the tilting module according to an embodiment. FIG. 12 is a longitudinal cross-sectional view, taken along line XII-XII of FIG. 11, and FIG. 13 is a longitudinal cross-sectional view, taken along line XIII-XIII of FIG. 11.

Figure 13:
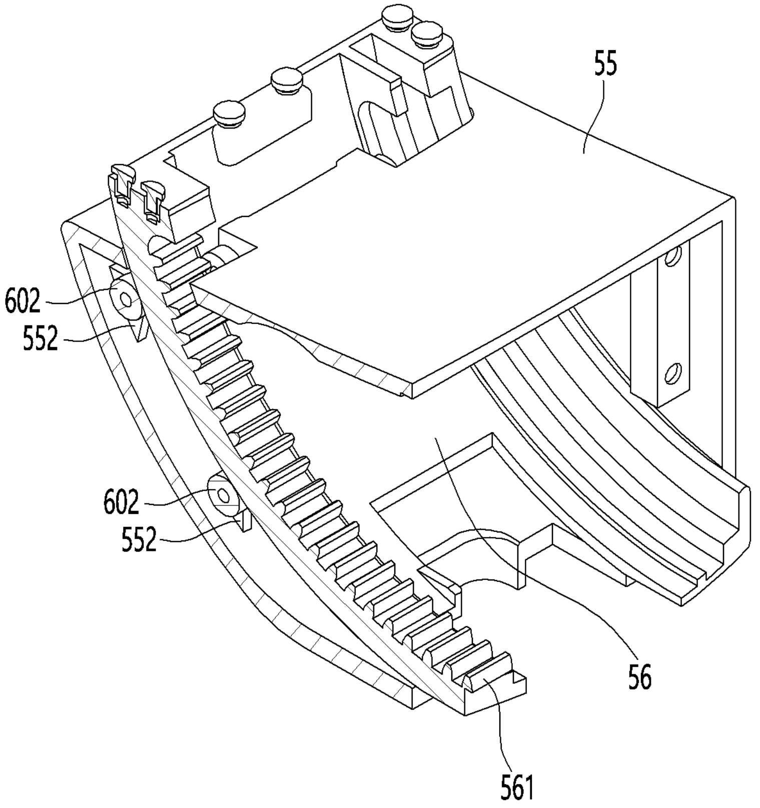
FIG. 13 is a longitudinal cross-sectional view, taken along line XIII-XIII in FIG. 11.

Referring to FIGS. 11 to 13, the tilting neck 56 rotates in the vertical direction while being supported by the guide roller 60. An outer surface (bottom surface) of the tilting neck 56 may be supported by outer guide roller 602, and an inner surface (upper surface) may be supported by inner guide roller 601. Additionally, the outer guide roller 602 may be provided as a pair at left and right or lateral edges of the tilting neck 56. In addition, multiple pairs of outer guide roller 602 may be provided in a longitudinal direction of the tilting neck 56. Like the outer guide roller 602, multiple pairs of the inner guide rollers 601 may be provided on the inner surface of the tilting neck 56.

The outer guide roller 602 may be connected to outer shaft 552 that protrudes from an inner surface of the shield cover 55 and contact the outer surface of the tilting neck 56. Additionally, the inner guide roller 601 may be connected to inner shaft 551 provided in the shielding cover 55 and may contact the inner surface of the tilting neck 56.

Figure 14:
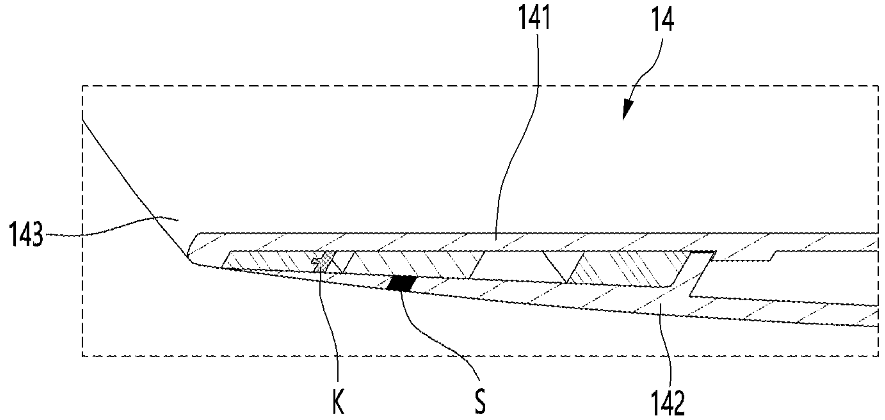
FIG. 14 is an enlarged view of portion A of FIG. 8.

FIG. 14 is an enlarged view of portion A of FIG. 8. Referring to FIG. 14, a light-emitting module K and a sensor member S may be mounted on the discharge cover 14, and at least a portion of the discharge cover 14 may be formed to be transparent to allow light irradiated from the light-emitting module K to be emitted to the outside. The sensor member S may include at least one of a temperature sensor that detects a temperature of air discharged through the main discharge port 131 and a humidity sensor that detects a humidity of air discharged through the main discharge port 131. The light emitting module K may include an LED module that emits light of a specific color.

For example, only an edge portion of the discharge cover 14 may be formed to be transparent in a strip shape. A remaining portion may be molded to be opaque. The portion formed to be transparent may be defined as a transparent portion 143. In addition, the light emitted from the light emitting module K may pass through the transparent portion 143 and be emitted to the outside of the discharge cover 14, so that it may be viewed by a user's eyes.

In addition, a luminance of light emitted from the light emitting module K may be varied or a color of the light may be changed depending on the temperature or humidity of the discharged air detected by the sensor member S. For example, as the temperature of the discharge air increases, a red light may be emitted to the outside through the transparent portion 143, and as the temperature decreases, a blue light may be emitted to the outside through the transparent portion 143.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dehumidifier, comprising:
- a housing including a suction grill formed on a rear surface thereof, and a discharge port formed on an upper surface thereof;
- a dehumidification module provided inside of the housing, wherein the dehumidification module includes at least a compressor, a condenser, an evaporator, and a fan module;
- a water tank detachably provided on one side of the housing and that stores condensate generated during a dehumidification process;
- a discharge cover that opens and closes the discharge port;
- a tilting module connected to a bottom of the discharge cover inside of the housing to tilt the discharge cover; and
- a shielding cover that accommodates the tilting module, wherein the tilting module includes:
- a tilting motor fixed to the shielding cover;
- a tilting gear connected to a shaft of the tilting motor;
- a tilting neck curved at a predetermined curvature and having on one surface thereof a tilting rack that engages with the tilting gear, and
- at least one bracket that couples the tilting motor to a rear surface of the shielding cover, wherein the at least one bracket includes:
  - a fixing bracket fixed to the rear surface of the shielding cover; and
  - a support bracket coupled to a front surface of the fixing bracket, and wherein a shaft of the tilting motor passes through the support bracket to be coupled to the tilting gear.

2. The dehumidifier according to claim 1, wherein the tilting module further comprises one or more inner guide rollers in contact with an upper surface of the tilting neck.

3. The dehumidifier according to claim 2, wherein the tilting module further comprises one or more outer guide rollers in contact with a lower surface of the tilting neck.

4. The dehumidifier according to claim 1, further comprising a cover sleeve which is cylindrical and connects an outlet of the fan module and the discharge port, wherein the fixing bracket is fixed to the cover sleeve.

5. The dehumidifier according to claim 4, wherein the discharge cover selectively shields an upper opening of the cover sleeve.

6. A dehumidifier, comprising:
- a housing including a suction grill formed on a rear surface thereof, and a discharge port formed on an upper surface thereof;
- a dehumidification module provided inside of the housing, wherein the dehumidification module includes at least a compressor, a condenser, an evaporator, and a fan module;
- a water tank detachably provided on one side of the housing and that stores condensate generated during a dehumidification process;
- a discharge cover that opens and closes the discharge port;
- a tilting module connected to a bottom of the discharge cover inside of the housing to tilt the discharge cover; and
- a shielding cover that accommodates the tilting module, wherein the tilting module includes:
  - a tilting motor fixed to the shielding cover;
  - a tilting gear connected to a shaft of the tilting motor; and
  - a tilting neck curved at a predetermined curvature and having on one surface thereof a tilting rack that engages with the tilting gear, wherein the discharge cover includes:
    - a circular upper plate;
    - a lower plate coupled to a bottom of the upper plate; and
    - a light emitting module provided between the upper plate and the lower plate, and wherein a transparent portion is configured to surround an edge of the discharge cover in a ring shape, such that light emitted from the light emitting module is discharged to an outside through the transparent portion.

7. The dehumidifier according to claim 6, further comprising at least one of:
- a temperature sensor exposed to the lower plate to detect a temperature of air discharged through the discharge port; and
- a humidity sensor exposed to the lower plate to detect a humidity of air discharged through the discharge port.

8. The dehumidifier according to claim 7, wherein a luminance or a color of the light emitted from the light emitting module is changed depending on the temperature of air detected by the temperature sensor or the humidity of air sensed by the humidity sensor.

9. A dehumidifier, comprising:
- a housing including a suction inlet formed on a first surface thereof, and a discharge outlet formed on a second surface thereof;
- a dehumidification module provided inside of the housing, wherein the dehumidification module includes at least a compressor, a condenser, an evaporator, and a fan module;
- a discharge cover that opens and closes the discharge port;
- a tilting module connected to a bottom of the discharge cover inside of the housing to tilt the discharge cover; and
- a shielding cover that accommodates the tilting module, wherein the tilting module includes:
  - a tilting motor fixed to the shielding cover;
  - a tilting gear connected to a shaft of the tilting motor;
  - a tilting neck curved at a predetermined curvature and having on one surface thereof a tilting rack that engages with the tilting gear, and at least one bracket that couples the tilting motor to a rear surface of the shielding cover, wherein the at least one bracket includes:

a fixing bracket fixed to the rear surface of the shielding cover; and a support bracket coupled to a front surface of the fixing bracket, and wherein a shaft of the tilting motor passes through the support bracket to be coupled to the tilting gear.

10. The dehumidifier according to claim 9, wherein the tilting module further comprises one or more inner guide rollers in contact with an upper surface of the tilting neck.

11. The dehumidifier according to claim 10, wherein the tilting module further comprises one or more outer guide rollers in contact with a lower surface of the tilting neck.

12. The dehumidifier according to claim 9, further comprising a cover sleeve which is cylindrical and connects an outlet of the fan module and the discharge outlet, wherein the fixing bracket is fixed to the cover sleeve.

13. The dehumidifier according to claim 9, wherein the discharge cover selectively shields an upper opening of the cover sleeve.

14. A dehumidifier, comprising:

a housing including a suction inlet formed on a first surface thereof, and a discharge outlet formed on a second surface thereof;

a dehumidification module provided inside of the housing, wherein the dehumidification module includes at least a compressor, a condenser, an evaporator, and a fan module;

a discharge cover that opens and closes the discharge port;

a tilting module connected to a bottom of the discharge cover inside of the housing to tilt the discharge cover; and a shielding cover that accommodates the tilting module, wherein the tilting module includes:

a tilting motor fixed to the shielding cover;

a tilting gear connected to a shaft of the tilting motor; and a tilting neck curved at a predetermined curvature and having on one surface thereof a tilting rack that engages with the tilting gear, wherein the discharge cover includes:

a circular upper plate;

a lower plate coupled to a bottom of the upper plate; and a light emitting module provided between the upper plate and the lower plate, and wherein a transparent portion is configured to surround an edge of the discharge cover in a ring shape, such that light emitted from the light emitting module is discharged to an outside through the transparent portion.

15. The dehumidifier according to claim 14, further comprising at least one of:

a temperature sensor exposed to the lower plate to detect a temperature of air discharged through the discharge outlet; and a humidity sensor exposed to the lower plate to detect a humidity of air discharged through the discharge outlet.

16. The dehumidifier according to claim 15, wherein a luminance or a color of the light emitted from the light emitting module is changed depending on the temperature of air detected by the temperature sensor or the humidity of air sensed by the humidity sensor.

* * * * *